(12) United States Patent
Furuya et al.

(10) Patent No.: US 7,142,686 B2
(45) Date of Patent: *Nov. 28, 2006

(54) COMPOUND SOUND GENERATOR

(75) Inventors: Masahito Furuya, Yamanashi-ken (JP); Hironori Kuwabara, Yamanashi-ken (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 274 days.

This patent is subject to a terminal disclaimer.

(21) Appl. No.: 10/677,358

(22) Filed: Oct. 3, 2003

(65) Prior Publication Data

US 2004/0071303 A1   Apr. 15, 2004

(30) Foreign Application Priority Data

Oct. 7, 2002   (JP)   ............................. 2002-294327

(51) Int. Cl.
*H04R 25/00*   (2006.01)

(52) U.S. Cl. ................. 381/396; 381/182; 381/349
(58) Field of Classification Search ............... 381/182, 381/186, 345, 349, 350–354, 396; 181/144–145
See application file for complete search history.

(56) References Cited

U.S. PATENT DOCUMENTS 3,995,124 A * 11/1976 Gabr .......................... 381/357
6,091,828 A *  7/2000 Akino et al. ................ 381/182

* cited by examiner

*Primary Examiner*—Suhan Ni
(74) *Attorney, Agent, or Firm*—Dennison, Schultz & MacDonald

(57) ABSTRACT

A case of the information equipment is provided for setting various parts in. A speaker and receiver are provided in the frame. A first back chamber is formed in the speaker and a second back chamber is formed in the receiver. A baffle is formed on a part of the frame for dividing the inner space of the case so as to separate the first and second back chambers from each other.

5 Claims, 3 Drawing Sheets

COMPOUND SOUND GENERATOR

BACKGROUND OF THE INVENTION

The present invention relates to a compound sound generator for an information equipment such as a portable telephone.

The compound sound generator has a speaker for converting a call signal into a sound and a receiver for converting a sound signal into a sound. The sound emitted from the receiver is heard with user's ear close to the telephone and the sound emitted from the speaker is heard even when the telephone is away. Thus the speaker generates sounds of larger volume than the receiver.

FIG. 6 is a sectional view of a conventional compound sound generator set in a case 20 of an information equipment.

The compound sound generator has a flat circular or ellipse shape and is set in a case 20 having substantially a shape of a box. In the case 20, there is provided an annular frame 1 made of synthetic resin on which various parts of the compound sound generator are mounted, and a common yoke 2 made of a magnetic material is mounted in the frame 1.

The yoke 2 comprises a flange 2a formed on an upper periphery of a cylindrical portion 2b having a bottom 2c. An annular first magnet 3 for the speaker is secured to the underside of the flange 2a, and a second magnet 8 for the receiver having disc shape is secured to the bottom 2c of the yoke 2. An annular first top plate 4 made of a magnetic material is secured to the underside of the first magnet 3, and a second top plate 9 having a disc shape is secured to the upper surface of the second magnet 8.

A first diaphragm 6 is secured to the underside of the frame 1, thereby forming a relatively small back chamber 22a between the diaphragm 6 and the yoke 2. A second diaphragm 11 is secured to the upper surface of the frame 1, thereby forming a relatively small back chamber 22b between the diaphragm 11 and the yoke 2. A first voice coil 5 and a second voice coil 10 are secured to inside surfaces of the first and second diaphragms 6 and 11, respectively. The first diaphragm 6 and the first voice coil 5 compose a first sound production device as a speaker, and the second diaphragm 11 and the second voice coil 10 compose a second sound production device as a receiver. Protectors 7 and 12 each having a dish shape and made of a thin metal plate are secured to the underside and upper surface of the frame 1 for protecting the diaphragms 6 and 11.

There is formed sound discharge holes 7a formed in the protector 7, sound discharge holes 12a in the protector 12.

The outer peripheries of the protector 7 and the diaphragm 6 are inserted and press fitted in an annular recess formed in a lower projection 1a of the frame 1. The outer peripheries of the protector 12 and the diaphragm 11 are inserted and press fitted in an annular recess formed in an upper projection 1b of the frame 1.

The compound sound generator is assembled into the case 20 with other parts. Cushioned annular spacers 21 are disposed between each of the protectors 7 and 12 at outer portions of the sound discharge holes 7a and 12a and the inner surface of the case 20.

The external case 20 has a plurality of sound discharge holes 20a formed in the bottom thereof and a sound discharge hole 20b formed in the upper surface thereof.

Sound produced by the diaphragm 11 is discharged through the sound discharge holes 12a and further outside through the sound discharge hole 20b as shown by an arrow a. Similarly, sound produced by the diaphragm 6 is discharged through the sound discharge holes 7a and further outside through the sound discharge holes 20a as shown by an arrow b. Mixing of sounds emitted from the back chambers 22a and 22b with the sounds emitted through the sound discharge holes 7a and 12a are prevented. The spacers 21 are provided to enhance the air-tightness, thereby separating the sounds from one another.

In order to allow the vibration of the diaphragms and to improve the acoustic characteristics such as volume and sound quality, the back chambers 22a and 22b are communicated with atmosphere. Namely, as shown by arrows c and d, air in the back chamber 22b flows through openings 1d partially formed in the projection 1b into the inner space of the case 20. Air in the back chamber 22a flows into the inner space of the case 20 through air passages 1c formed in the shoulder of the frame 1 as shown by arrows e and f.

In the conventional compound sound generator, the back chambers 22a and 22b are thus communicated with the entire inner space of the case 20. Therefor, a part of the airflow from one of the hack chambers 22b and 22a may flow into the other back chamber through the openings 1d or the passages 1c as shown by arrows g and h. Hence, when the diaphragm 6 for the speaker is vibrated, the produced sound causes the air pressure to change, thereby vibrating the diaphragm 11 for the receiver so that sound is also emitted from the receiver. If a large sound is emitted from the receiver with user's ear close to the telephone, user's ear may be hurt. In another case, telephone conversation may leak out and be heard by others through the receiver.

SUMMARY OF THE INVENTION

An object of the present invention is to provide a compound sound generator which prevents sound leaking and causing vibration of the other diaphragm.

According to the present invention, there is provided a sound generator for an information equipment comprising a case of the equipment, a frame set in the case, a speaker and receiver provided in the frame, the speaker having a first diaphragm and the receiver having a second diaphragm, a first back chamber behind the first diaphragm of the speaker and a second back chamber behind the second diaphragm of the receiver, and a baffle formed on a part of the frame for dividing the inner space of the case so as to separate the first and second back chambers of the compound sound generator from each other.

One of the first and second back chambers of the speaker and the receiver is opened to the outside of the case, the other chamber is opened to the inner space of the case.

The first back chamber of the speaker is opened to the outside of the case.

The second back chamber of the receiver is opened to the outside of the case at a same surface as a surface where a sound discharge opening of the speaker is formed.

The first back chamber of the receiver is opened to the outside of the case at a surface different from a surface where a sound discharge opening of the speaker is formed.

These and other objects and features of the present invention will become more apparent from the following detailed description with reference to the accompanying drawings.

DETAILED DESCRIPTION OF THE PREFERRED EMBODIMENT

Figure 1:
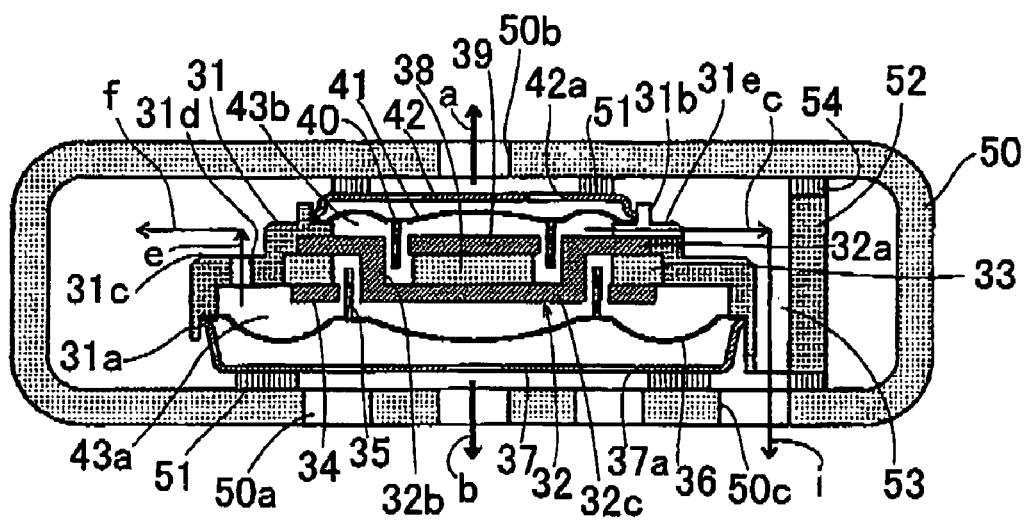
FIG. 1 is a sectional view showing a compound sound generator according to a first embodiment of the present invention, set in a case of a portable telephone.
Figure 2:
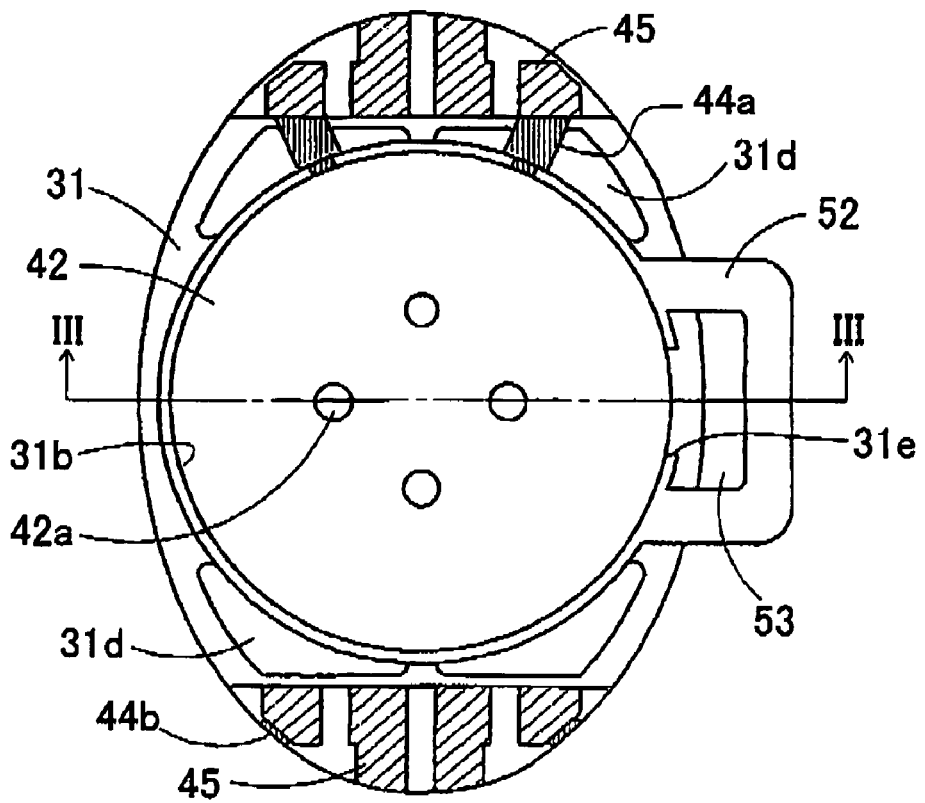
FIG. 2 is a plan view showing an upper part of the compound sound generator of the first embodiment.
Figure 3:
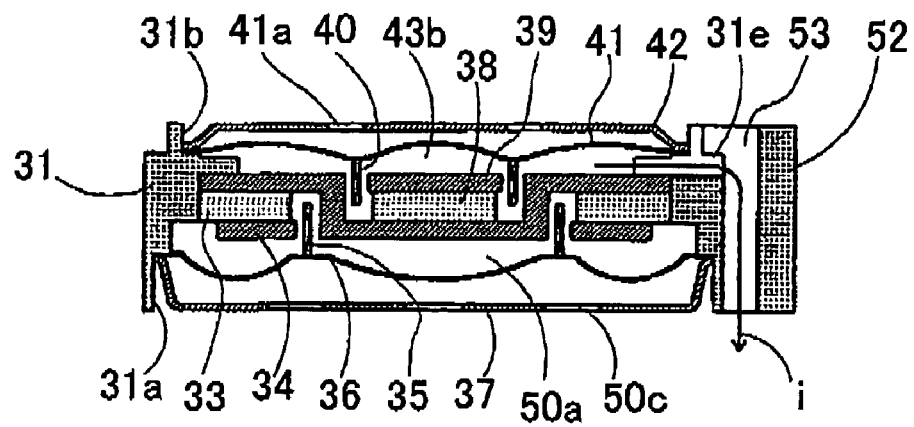
FIG. 3 is a sectional view taken along a line III—III of FIG. 2.
Figure 4:
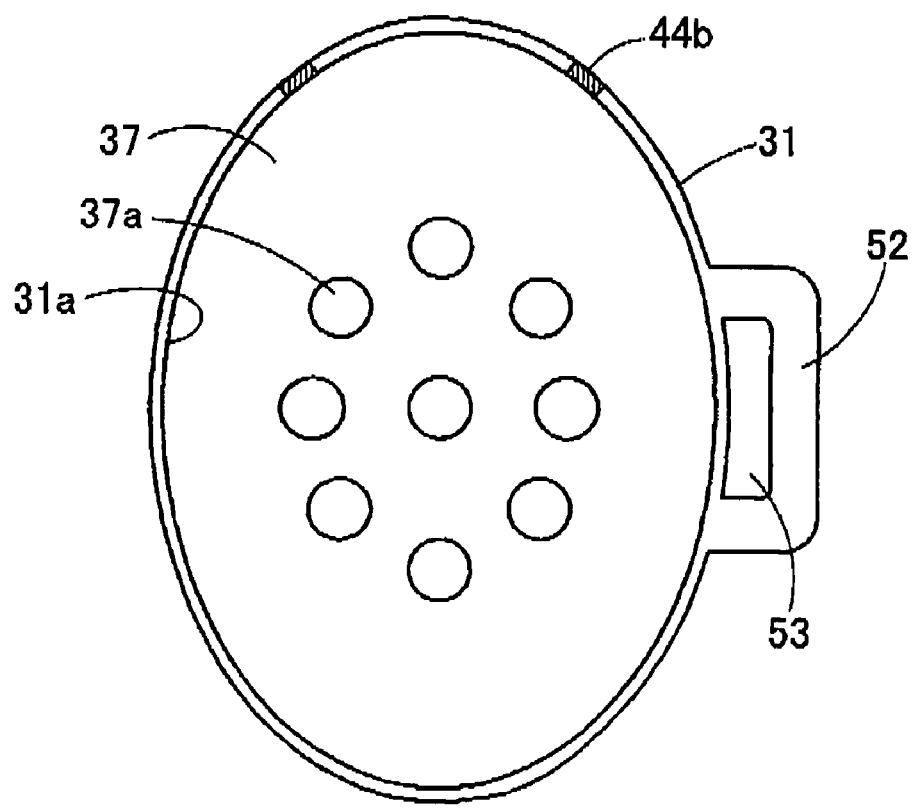
FIG. 4 is a plan view showing an underside of the compound sound generator.

FIG. 1 is a sectional view of a compound sound generator of a first embodiment according to the present invention, set in a case of a portable telephone, FIG. 2 is a plan view of the sound generator, FIG. 3 is a sectional view taken along a line III—III of FIG. 2, and FIG. 4 is an underside view.

The compound sound generator of the present invention is set in an ellipse shaped case 50. In the case 50, there is provided a frame 31 made of synthetic resin, on which various parts of the sound generator are mounted, and a common yoke 32 made of a magnetic material is mounted in the frame 31.

The yoke 32 comprises a flange 32a formed on an upper periphery of a cylindrical portion 32b having a bottom 32c. An annular first magnet 33 is secured to the underside of the flange 32a with an adhesive, and a second magnet 38 having disc shape is secured to the bottom 32c of the yoke 32. An annular first top plate 34 made of a magnetic material is secured to the underside of the first magnet 33, and a second top plate 39 having a disc shape is secured to the upper surface of the second magnet 38.

A first diaphragm 36 is secured to the underside of the frame 31, thereby to form a back chamber 43a between the diaphragm 36 and the yoke 32. A second diaphragm 41 is secured to the upper surface of the frame 31, thereby to form a back chamber 43b between the diaphragm 41 and the yoke 32. The first diaphragm has a larger size approximate to the protector 37, and the second diaphragm has a smaller size approximate to the protector 42. A first voice coil 35 and a second voice coil 40 are secured to inside surfaces of the first and second diaphragms 36 and 41, respectively. The first diaphragm 36 and the first voice coil 35 compose a first sound production device as a speaker, and the second diaphragm 41 and the second voice coil 40 compose a second sound production device as a receiver. First and second protectors 37 and 42, each having a dish shape and made of a thin metal plate, are secured to the underside and upper surface of the frame 31 for protecting the diaphragms 36 and 41.

The first protector 37 has a sound discharge holes 37a so as to discharge sounds generated by the first diaphragm 36 in the downward direction. The second protector 42 has sound discharge holes 42a so as to discharge sounds generated by the second diaphragm 41 in the upward direction.

The frame 31 has a lower projection 31a and an upper projection 31b. In the lower projection 31a, an annular recess is formed so that the outer peripheries of the protector 37 and the diaphragm 36 are inserted and press fitted therein.

In the upper projection 31b, an annular recess is formed so that the outer peripheries of the protector 42 and the diaphragm 41 are inserted and press fitted therein. In a shoulder 31c of the frame 31, an air passage 31d is formed. An opening 31e is formed in the lower portion of the upper projection 31b at the opposite side of the air passage 31d.

In accordance with the present invention, the frame 31 further has an integrally formed U-shaped baffle 52 so as to surround the opening 31e as shown in FIG. 2. The baffle extends vertically through the entire inner height of the case 50, thereby forming an air passage 53 as shown in FIG. 1.

The sound generator is assembled into the case 50 with other parts. Annular spacers 51 are disposed between each of the protectors 37 and 42 and the case 50 at the outer portions of the sound discharge holes 37a and 42a, Upper and lower spacers 54 are interposed between the upper and lower ends of the baffle 52 and the case 50.

The case 50 has a plurality of sound discharge holes 50a formed in the bottom thereof at a portion inside the spacers 51 and a sound discharge hole 50b formed in the upper surface thereof. Another sound discharge hole 50c is formed in the bottom opposing the lower end of the air passage 53.

Referring to FIG. 2, metal terminal electrodes 45 are molded in the frame 31. Grooves 44a and 44b are formed in the frame 31 at a position lower than the protection 31b and at a position upper than the projection 31a, respectively, so as to allow the end portions of the voice coils 35 and 40 to be connected to the electrodes.

Sounds generated by the diaphragm 41 are discharged through the sound discharge holes 42a of the protector 42 and further outside of the case 50 through the sound discharge hole 50b as shown by the arrow a. Similarly, sounds generated by the diaphragm 36 are discharged through, the sound discharge holes 37a of the protector 37 and further outside the case through sound discharge holes 50a as shown by the arrow b. As shown by the arrow c, air in the back chamber 43b flows through the opening 31e formed in the projection 31b into the air passage 53 and further out of the case 50 through the opening 50c as shown by an arrow i. Air in the back chamber 43a flows into the inner space of the case 50 through air passages 31d formed in the shoulder 31c of the frame 31 as shown by the arrows e and f. Namely, the back chambers 43a and 43b are not communicated with each other so that the air in one of the chambers is prevented from entering the other chamber through the space in the case 50. It is assumed that the vibrations of the diaphragms are not affected by the sounds outside the case.

Thus, in the present invention, the sound from the speaker is only emitted from the sound discharge holes 50a and the sound from the receiver is only emitted from the sound discharge hole 50b. Hence the problems of injury to the ear and leaking of conversation do not occur.

Figure 5:
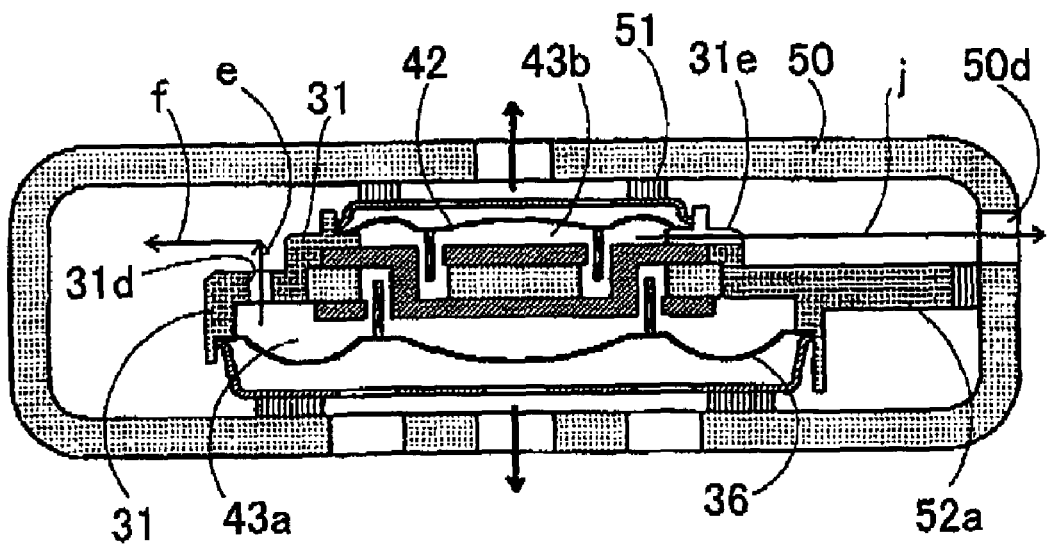
FIG. 5 is a sectional view showing a second embodiment of the present invention.
Figure 6:
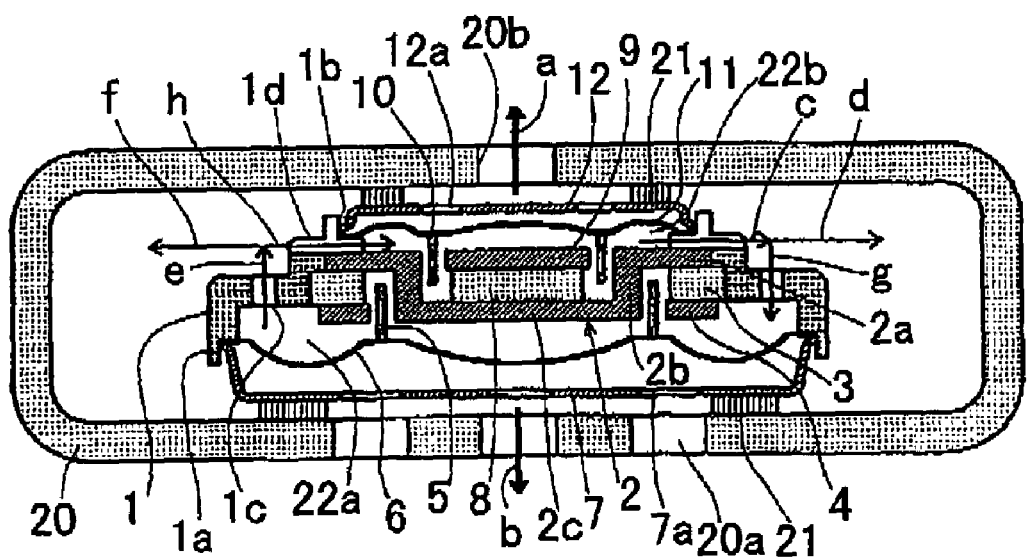
FIG. 6 is a sectional side view showing a conventional compound sound generator set in a case of a portable telephone.

FIG. 5 shows a second embodiment of the present invention wherein the frame 31 has a horizontal baffle 52a integral thereto. In the present embodiment, a sound discharge hole 50d is formed in the side wall of the case 50 so that the back chamber 43b is communicated with the atmosphere through the opening 31e and the discharge hole 50d as shown by an arrow j. The present embodiment provides a wider range of design choice in manufacturing the compound sound generator.

The present invention is not limited to the embodiments described above. For example, the back chamber of the receiver may be communicated with a sealed space of a predetermined volume formed in the case instead of with the atmosphere. Alternatively, the back chamber of the speaker may be communicated with the atmosphere. Various modifications of structure of the baffle and air passage and acoustic separating method and the material thereof are further possible.

The present invention provides a compound sound generator where the back chambers of each of the speaker and the receiver are effectively separated from each other by a simple and inexpensive means of providing a baffle. Accordingly, injury to the ear and leaking of conversation are prevented.

While the invention has been described in conjunction with preferred specific embodiment thereof, it will be understood that this description is intended to illustrate and not limit the scope of the invention, which is defined by the following claims.

What is claimed is:

1. A compound sound generator for an information equipment comprising:
    a case of the equipment, the case having an inner surface;
    a frame set in the case;
    a speaker and receiver provided in the frame, the speaker having a first diaphragm and the receiver having a second diaphragm;
    a first protector and a second protector, each having sound discharge holes, secured to the frame for protecting the first diaphragm and the second diaphragm, respectively;
    a first back chamber behind the first diaphragm of the speaker and a second back chamber behind the second diaphragm of the receiver;
    first and second annular spacers provided between the inner surface of the case and the outer surfaces of the first protector and second protector, respectively, so as to surround the sound discharge holes of the protectors;
    openings provided in the frame to communicate the first and second back chambers with the inside space of the case so as to discharge sounds generated in the first and second back chambers;
    a baffle provided between the inner surface of the case and an outer surface of the frame so as to prevent airflow from one of the back chambers from flowing into the other back chamber.

2. The compound sound generator according to claim 1 the baffle is formed as a part of the frame.

3. The compound sound generator according to claim 1 wherein the first back chamber of the speaker is opened to the outside of the case.

4. The compound sound generator according to claim 1 wherein the second back chamber of the receiver is opened to the outside of the case at a same surface as a surface where a sound discharge opening of the speaker is formed.

5. The compound sound generator according to claim 3 wherein the second back chamber of the receiver is opened to the outside of the case at a surface different from a surface where a sound discharge opening of the speaker is formed.

* * * * *